(12) United States Patent
Weyh et al.

(10) Patent No.: US 12,508,678 B2
(45) Date of Patent: Dec. 30, 2025

(54) APPARATUS AND METHOD FOR CUTTING A FILM-LIKE WORKPIECE

(71) Applicant: Sonplas GmbH, Straubing (DE)

(72) Inventors: Lars Weyh, Künzell (DE); Benedikt Schmuck, Bernried (DE); Florian Thalhofer, Langenneufnach (DE)

(73) Assignee: Sonplas GmbH, Straubing (DE)

( * ) Notice: Subject to any disclaimer, the term of this patent is extended or adjusted under 35 U.S.C. 154(b) by 409 days.

(21) Appl. No.: 18/342,119

(22) Filed: Jun. 27, 2023

(65) Prior Publication Data

US 2024/0001495 A1    Jan. 4, 2024

(30) Foreign Application Priority Data

Jun. 29, 2022   (EP) .................................... 22181936

(51) Int. Cl.
| | |
|---|---|
| *B23K 37/04* | (2006.01) |
| *B23K 26/38* | (2014.01) |
| *B23K 101/36* | (2006.01) |
| *B23Q 3/08* | (2006.01) |

(52) U.S. Cl.
CPC .......... *B23K 37/0408* (2013.01); *B23K 26/38* (2013.01); *B23Q 3/088* (2013.01); *B23K 2101/36* (2018.08)

(58) Field of Classification Search
CPC ............................ B23K 26/38; B23K 37/0408
See application file for complete search history.

(56) References Cited

U.S. PATENT DOCUMENTS

| | | | | | |
|---|---|---|---|---|---|
| 3,199,860 | A | * | 8/1965 | Moberg ............... | B26D 7/0006 269/87.2 |
| 3,576,148 | A | * | 4/1971 | Katz ...................... | B26B 29/06 83/522.18 |
| 3,787,968 | A | * | 1/1974 | Littmann ............... | B26D 1/025 83/454 |

(Continued)

FOREIGN PATENT DOCUMENTS

| | | | | |
|---|---|---|---|---|
| CN | 206474803 U | | 9/2017 | |
| EP | 1304198 A2 | * | 4/2003 | ............. B23K 26/38 |

(Continued)

*Primary Examiner* — Jason L Vaughan
(74) *Attorney, Agent, or Firm* — Studebaker Brackett PLLC

(57) ABSTRACT

The invention relates to an apparatus and a method for cutting a film-like workpiece, in particular an electrode sheet, by means of a laser beam with a clamping assembly for a sheet-shaped starting material. According to the invention it is provided that the clamping assembly comprises a first clamping plate device and a second clamping plate device, between which the sheet-shaped starting material can be clamped, wherein at least one clamping plate device comprises an outer clamping unit, which is adapted to an outer contour of the workpiece, and an inner cover element, which, during cutting, is arranged inside the outer clamping unit and covers an inner surface of the workpiece, wherein a passage gap for the laser beam is formed between the outer clamping unit and the inner cover element, and that a laser beam device is provided and configured to generate a laser beam and to guide it along the formed passage gap.

13 Claims, 4 Drawing Sheets

(56) References Cited

U.S. PATENT DOCUMENTS

Figure 1:
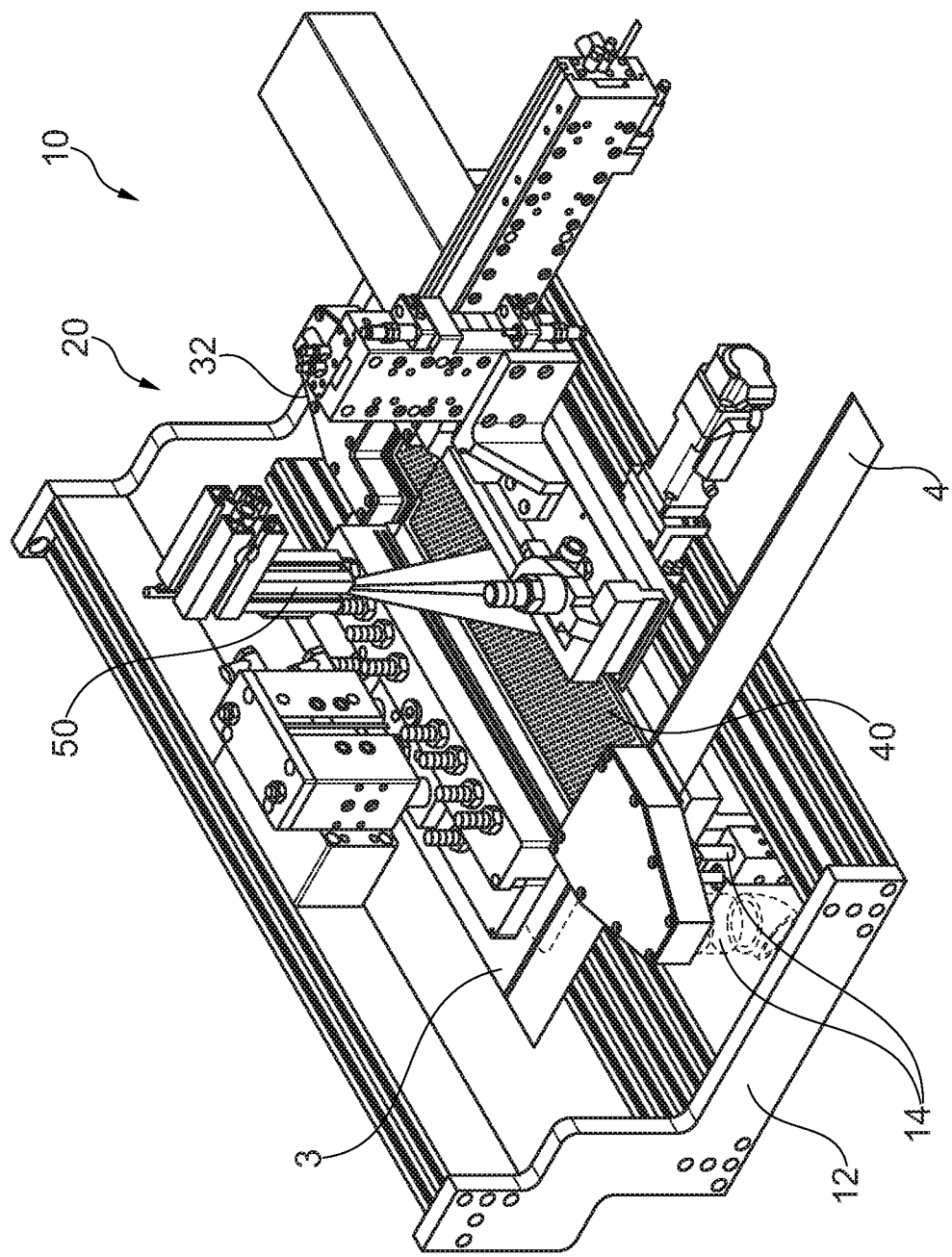

| | | | | |
|---|---|---|---|---|
| 4,262,186 | A | * | 4/1981 | Provancher ............ B23K 26/18 |
| | | | | 347/225 |
| 4,362,077 | A | * | 12/1982 | Gerber .................. B26F 1/3813 |
| | | | | 83/940 |
| 4,382,590 | A | * | 5/1983 | Pandya .................... B26B 29/06 |
| | | | | 33/32.2 |
| 4,938,834 | A | | 7/1990 | Yamamoto et al. |
| 5,436,423 | A | * | 7/1995 | Welty ........................ B26F 3/16 |
| | | | | 83/219 |
| 5,922,225 | A | * | 7/1999 | Blake ..................... B23K 26/10 |
| | | | | 219/121.84 |
| 6,031,199 | A | * | 2/2000 | Ream ..................... B23K 26/38 |
| | | | | 219/121.64 |
| 6,182,956 | B1 | * | 2/2001 | McMillan .............. B25B 11/005 |
| | | | | 269/21 |
| 9,744,622 | B2 | * | 8/2017 | Huonker ............... B23K 26/128 |
| 11,878,375 | B2 | * | 1/2024 | Wetter ............... B23K 37/0408 |
| 2004/0016731 | A1 | * | 1/2004 | Erlenmaier ............ B23K 26/38 |
| | | | | 219/121.82 |
| 2009/0134201 | A1 | | 5/2009 | Jindo et al. |
| 2020/0206844 | A1 | | 7/2020 | Zediker et al. |
| 2023/0364710 | A1 | * | 11/2023 | Okita .................. B23K 26/082 |

FOREIGN PATENT DOCUMENTS

| | | |
|---|---|---|
| JP | 6029351 B2 | 11/2016 |
| JP | 2018-067421 A | 4/2018 |
| WO | 2014/041588 A1 | 3/2014 |

* cited by examiner

APPARATUS AND METHOD FOR CUTTING A FILM-LIKE WORKPIECE

The invention relates to an apparatus for cutting a film-like workpiece, in particular an electrode sheet, by means of a laser beam with a clamping assembly for a sheet-shaped starting material, according to the preamble of claim 1.

The invention further relates to a method for cutting a film-like workpiece, in particular an electrode sheet, by means of a laser beam with an apparatus having a clamping assembly, according to the preamble of claim 12.

Modern batteries and accumulators are made up of a large number of very thin and sensitive electrode sheets. In this process, the electrode sheets are stacked on top of each other, each with a fine membrane lying in between, in order so to form an accumulator cell.

The electrode sheets are produced by punching or laser cutting from a starting material and have a carrier sheet which is provided with a coating. The sensitive electrode sheets must be processed in a dust-free condition and must not have any deformations or burrs. These could cause a short circuit in the electrode stack. This would render the accumulator cell unusable or it could catch fire.

Such electrode sheets are processed automatically and must be handled very carefully and with great care. Contamination from the cutting process must also be avoided, if necessary with elaborate cleaning and testing steps.

The object underlying the invention is to provide an apparatus and a method with which film-like workpieces can be cut particularly gently and reliably.

The object is achieved on the one hand by an apparatus having the features of claim 1 and on the other hand by a method having the features of claim 12. Preferred embodiments of the invention are indicated in the dependent claims.

An apparatus according to the invention is characterized in that the clamping assembly comprises a first clamping plate device and a second clamping plate device, between which the sheet-shaped starting material can be clamped, wherein at least one clamping plate device comprises an outer clamping unit which is adapted to an outer contour of the workpiece and an inner cover element, which, during cutting, is arranged inside the outer clamping unit and covers an inner surface of the workpiece, wherein a passage gap for the laser beam is formed between the outer clamping unit and the inner cover element, and in that a laser beam device is provided and is configured to generate a laser beam and to guide it along the passage gap formed.

A basic idea of the invention is to use a laser beam device for cutting a film-like workpiece, in particular an electrode sheet, from a starting foil or a starting web. The workpiece is clamped between two clamping plate devices from above and from below. The two clamping plate devices are each provided with a preferably plate-like outer clamping unit and a preferably plate-like inner cover element, which cover the workpiece in such a way that essentially only a passage gap remains open for the laser beam. The passage gap thus defines an outer contour of the workpiece to be cut. The outer clamping unit can partially or completely delimit the workpiece.

This initially provides a clearly defined working and cutting area for the laser beam. In addition, covering the workpiece with the two clamping plate devices outside the cutting gap ensures that no vaporized or blown-off material particles, which can occur during laser beam processing, are deposited on the workpiece surfaces. This allows for cleaning of the workpieces after laser cutting, which would otherwise be necessary, to be eliminated or at least greatly reduced. The apparatus according to the invention can increase a quality of the cut workpiece and simplify the processing.

A preferred variant of the invention is that the inner cover element is formed plate-shaped and separate from the outer clamping unit. Thus, for example, the workpiece can be clamped first with the outer clamping unit and then with the inner cover element or vice versa.

According to a further development of the invention, it is particularly advantageous that the inner cover element has a holding device for holding the cut workpiece. Thus, when the film-like workpiece is completely cut out of the starting material, the latter can be secured in its position by the holding device. This is advantageous for further handling of the workpiece.

According to one embodiment variant of the invention, it is particularly preferable that the holding device comprises a suction device, in particular a vacuum plate. In this case, the inner cover element can in whole or in part be configured as a vacuum plate, which is in line connection with a negative pressure unit. Via corresponding channels and openings, a negative pressure can thus be generated with which the film-like workpiece is held on the resting inner cover element. Such holding by means of a suction device is particularly gentle, so that it can also be used for very thin and delicate film-like workpieces.

Another advantageous embodiment of the invention is that the inner cover element is formed with the holding device for gripping and displacing the cut workpiece. The inner cover element having the holding device can thus hold the cut workpiece on the inner cover element and, by means of a corresponding displacement or moving device, the inner cover element with the holding device and the workpiece gripped or held therewith can be transported out of the apparatus to a further processing step or to a delivery position. Such handling is also particularly gentle, so that it is also suitable for particularly thin and delicate workpieces.

According to a further embodiment of the invention, a further improvement against contamination of the workpieces is achieved in that one or multiple nozzles are arranged along the passage gap on the outer clamping unit or the inner cover for suctioning off and/or blowing off ablation particles during cutting by means of the laser beam. Unlike the holding device having a vacuum plate, the device for suctioning-off does not lightly suck in and generate a negative pressure to hold the workpiece. Rather, material vaporized and flaked off directly during the cutting process by means of the laser, i.e. ablation particles, are suctioned-off directly at the cutting gap together with ambient air. Alternatively or additionally, a blow-off air flow can be generated by means of a blow-off device. In this way, ablation particles can neither deposit on the workpiece nor on the free surface on the apparatus. This also reduces a cleaning and maintenance effort both on the workpieces and on the apparatus. For this purpose, with or without active blowing, in particular a sharp air flow with a relatively high flow velocity of up to 300 m per second, preferably between 200 and 300 m per second, can be generated. This allows particularly reliable and comprehensive suctioning-off of air contaminated with ablation particles and/or blowing off of the ablation particles. Depending on the layout of the film-like workpiece, the passage gap can have a C geometry (with three sides) or any other shape.

It is particularly advantageous that at least one nozzle is designed as a slot nozzle with an elongated opening slot extending along the passage gap. The slot nozzle with the elongated opening slot is arranged on at least one element of the outer clamping unit or the inner cover element along at least one section of the passage gap and faces the passage gap. The outer clamping unit can be made up of several elements or components, which together enclose an outer contour of the workpiece to be cut.

A slot nozzle may be formed on some or all of these components of the outer clamping unit or the inner cover element so that air contaminated with ablation particles can be suctioned-off by the laser directly at the ablation point of the workpiece material.

It is particularly preferred that the outer clamping unit or the inner cover element comprises several suction plates with nozzles. In this case, the nozzle plates comprise at least one flow channel or air conduit, which is connected to the at least one nozzle, in particular a slot nozzle. The nozzle plates are in line connection with a corresponding suction device and/or a flow device, such as a blower. A filter unit or other separation unit can be provided on the suction device for cleaning the contaminated air from the ablation particles.

A further improvement of the processing on a film-like workpiece can be achieved by providing a supply device for supplying a workpiece to be cut, wherein the workpiece can be supplied between the two clamping plate devices, using the supply device. The supply device can be designed in any suitable way, for example with driven conveyor wheels or conveyor belts for a gentle transport of a film-like starting material. In particular, the starting material can be a web material that is reeled off from a coil and supplied via the supply device for processing and cutting. This permits particularly gentle feeding of the sensitive starting material.

It is also particularly advantageous that the first clamping plate device and the second clamping plate device can be moved relatively towards or away from each other for clamping the workpiece. A suitable positioning device can be provided for this purpose, which preferably comprises one or multiple actuating cylinders. The actuating cylinders can preferably be operated pneumatically or hydraulically.

According to another embodiment of the invention, it is preferred that a camera device is arranged for detecting the workpiece, in particular a position of the workpiece. The camera device can in particular have a camera which is above the workpiece in the processing position. Via the camera device, the exact positioning of the workpiece prior to the start of cutting and/or a finished contour of the workpiece after cutting can thus be recorded and preferably transmitted to an electronic evaluation unit. The evaluation unit can determine and verify a correct work sequence and a correct work result.

The invention further relates to a method for cutting a film-like workpiece, in particular by means of the above-described apparatus, the method being characterized in that the clamping assembly comprises a first clamping plate device and a second clamping plate device between which the sheet-shaped starting material is clamped, the at least one clamping plate device comprises an outer clamping unit, which is adapted to an outer contour of the workpiece, and an inner cover element which, for cutting, is arranged inside the outer clamping unit and covers an inner surface of the workpiece, a passage gap for the laser beam being formed between the outer clamping unit and the inner cover element, and in that a laser beam device is provided by means of which a laser beam is generated and guided along the passage gap formed.

The method according to the invention can in particular be performed using the apparatus described above. The advantages described above can be here achieved.

An advantageous variant of the method is that, for cutting, a laser beam passes above a surface of the workpiece along the passage gap to ablate workpiece material, and that one or more above-passing, in particular two or three above-passings, are performed to cut off the workpiece. Even with thin workpieces, a more accurate and gentle separation of the workpiece can be achieved with multiple above-passings. In particular, the heat input power of the laser into the workpiece per cutting operation can be reduced, which also reduces a fundamentally undesirable heat-inducing zone in adjacent workpiece areas accordingly.

Figure 2:
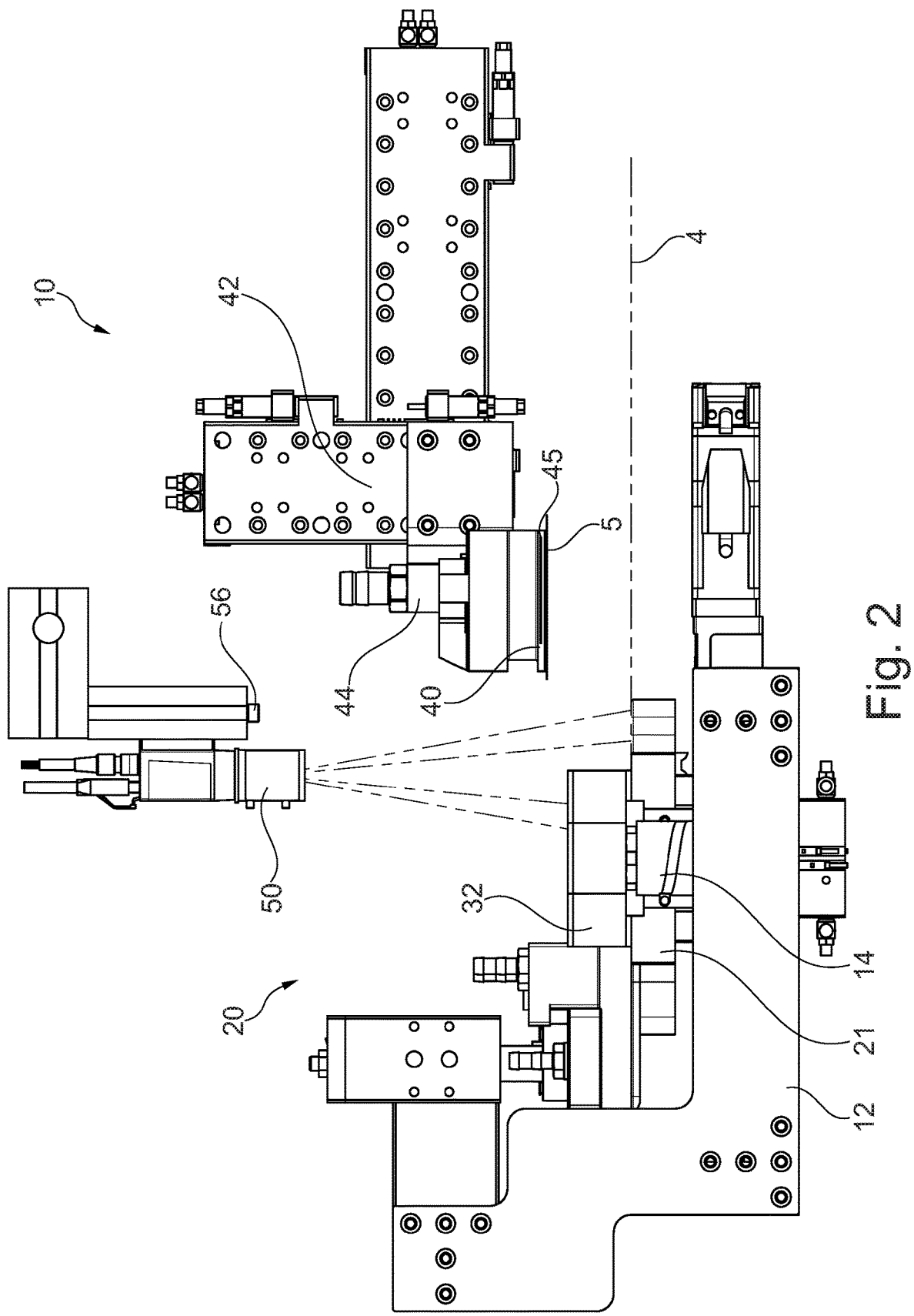
Figure 3:
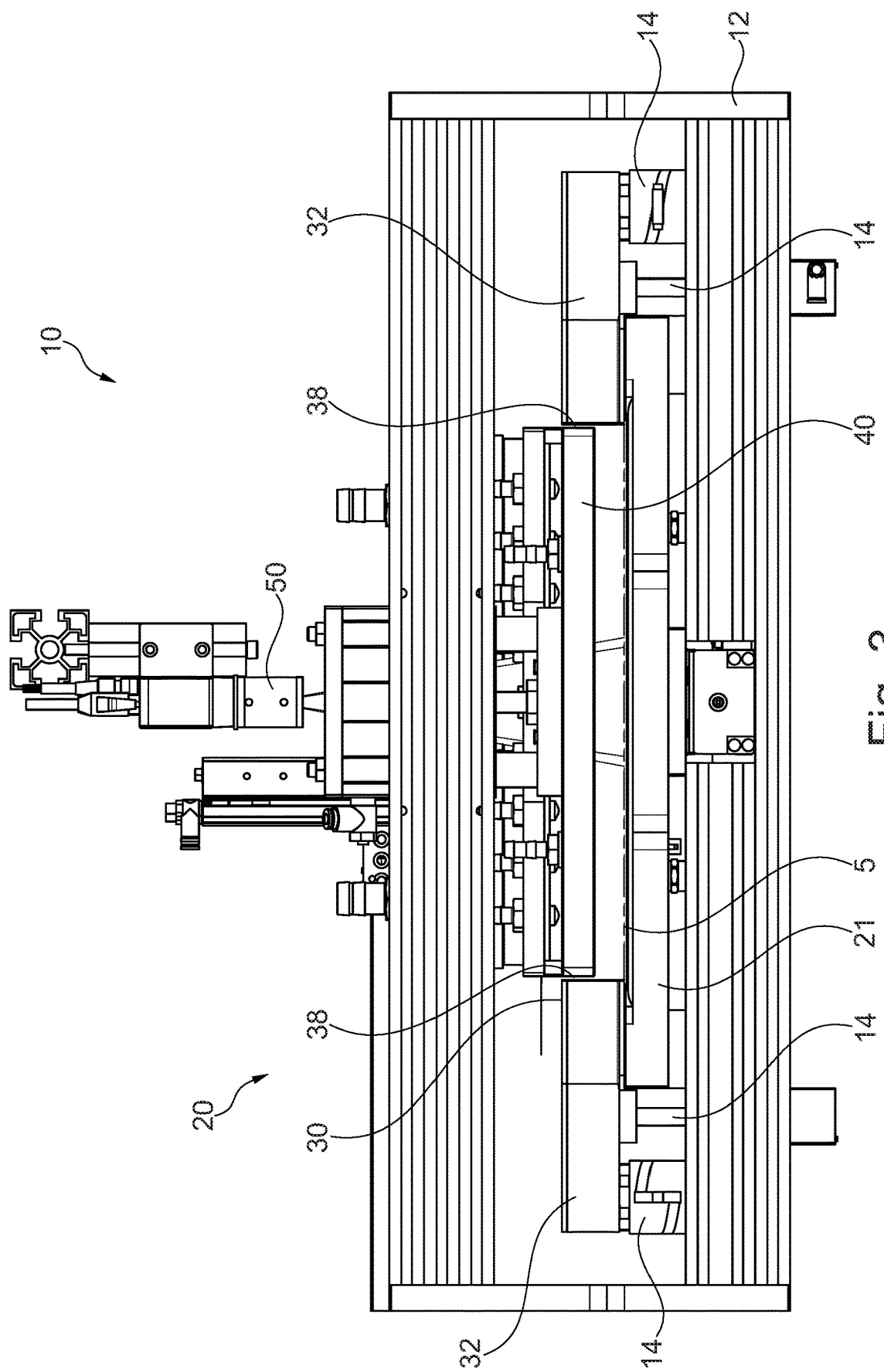

The invention is described in greater detail below with reference to a preferred exemplary embodiment, which is shown schematically in the drawings. The drawings show in:

FIG. 1 a perspective view of an apparatus according to the invention;

FIG. 2 a side view of the apparatus of FIG. 1;

FIG. 3 a front view of the apparatus according to FIGS. 1 and 2; and

Figure 4:
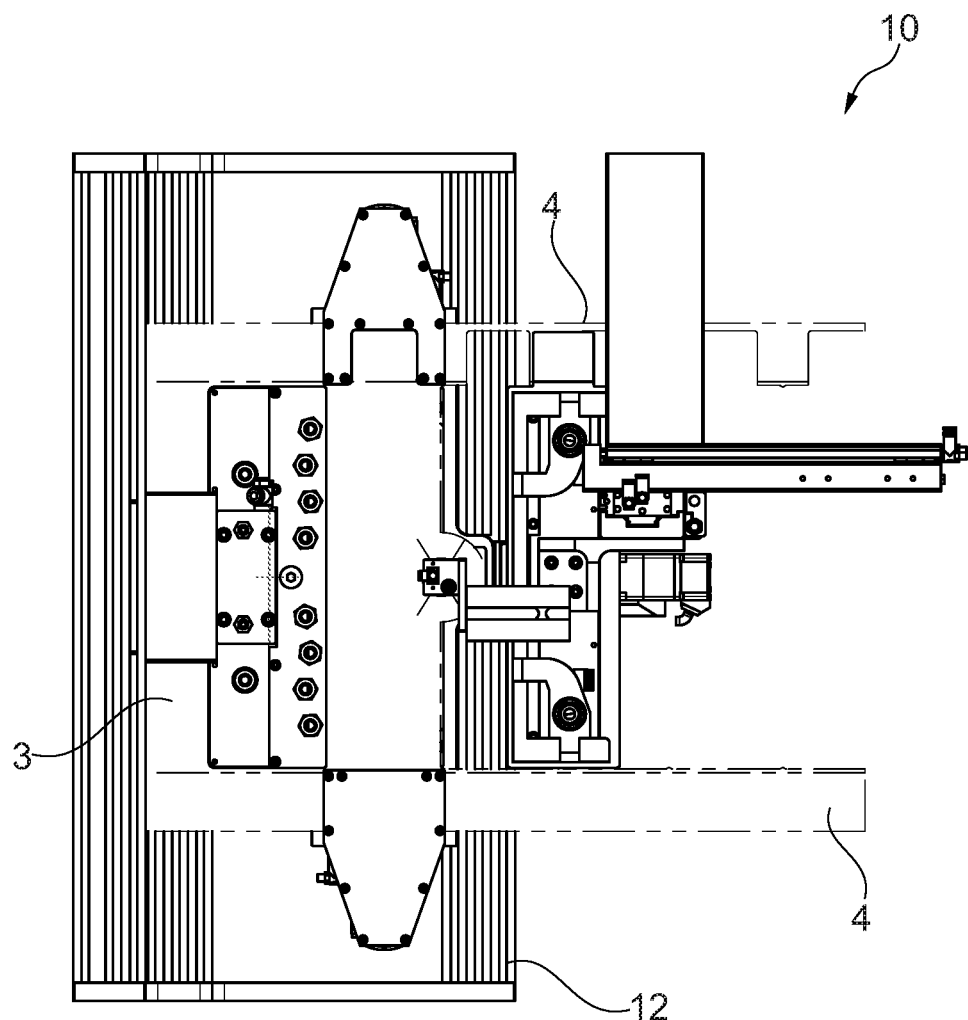

FIG. 4 a top view of the apparatus of FIGS. 1 to 3 from above.

A possible embodiment of an apparatus 10 according to the invention is explained below in conjunction with FIGS. 1 to 4. The apparatus 10 comprises a base frame 12 with a central clamping assembly 20. The clamping assembly 20 comprises a lower first clamping plate device 21 and a second clamping plate device 30 located above. A web-shaped or sheet-shaped starting material 3 is supplied between the two clamping plate devices 21, 30 by means of a supply device not shown in greater detail. The starting material 3 can be configured to form a so-called electrode sheet as a workpiece 5 to be manufactured. A lateral trimming residue 4 can be discharged from the apparatus 10.

By relatively moving the first clamping plate device 21 and/or the second clamping plate device 30 towards one another via vertically directed lifting elements 14, the starting material 3 can be clamped between the lower first clamping plate device 21 and the upper second clamping plate device 30. The lower first clamping plate device 21 can basically be formed as a continuous receiving plate or as well in multiple parts.

In the illustrated exemplary embodiment, the second clamping plate device 30 can have a plate-shaped outer clamping unit 32, which is adapted to an outer contour of the workpiece 5 to be formed and partially or completely defines this contour.

Furthermore, the second clamping plate device 30 may have a plate-shaped inner cover element 40, which is designed as a holding device 42 for holding and moving the cut workpiece 3, as can be seen particularly clearly in FIG. 2. In this regard, the holding device 42 may be provided with a suction device 44 having a vacuum plate 45 which has small suction openings in a contact area with the sheet-shaped workpiece 5. In doing so, the thin and delicate workpiece 5 can be gently suctioned in and held on the holding device 42 and thus transported out of the apparatus 10. The holding device 42 having a holding arm can preferably be automatically couplable and detachable relative to the plate-shaped inner cover element 40.

The outer clamping unit 32 and the plate-shaped inner cover element 40 are adapted to each other in terms of their dimensions so that a narrow passage gap 38 remains between the outer clamping unit 32 and the internally located cover element 40 for cropping the workpiece contour.

By means of a laser beam device 50 above the clamping assembly 20, one or more laser beams, which are indicated in the Figures, can be generated, which are guided in one or more sweeps along the passage gap 38 along the surface of the workpiece 5, so that the latter is gently and at the same time precisely separated from the strip-shaped starting material 3.

During cutting, contaminated air with vaporized or blown-off workpiece material particles can be sucked-off close to the processing location and/or the particles can be sucked-off via nozzles not shown in greater detail, which can be configured in particular as elongated slot nozzles. In this way, contamination of the workpiece 5 as well as of the apparatus 10 as a whole can be avoided or kept low.

By means of a camera device 56, which can be provided close to the laser device 50 above the clamping assembly 20, a position of the workpiece 5 before and after processing and/or a cutting result after cutting can be detected. The camera device 56 can be connected to a (non-illustrated) control and evaluation unit.

The invention claimed is:

1. An apparatus for cutting a film-like workpiece, such as an electrode sheet, by means of a laser beam with a clamping assembly for a sheet-shaped starting material, wherein the clamping assembly comprises a first clamping plate device and a second clamping plate device, between which the sheet-shaped starting material can be clamped, wherein at least one clamping plate device comprises an outer clamping unit, which is adapted to an outer contour of the workpiece, and an inner cover element which, during cutting, is arranged inside the outer clamping unit and covers an inner surface of the workpiece, wherein a passage gap for the laser beam is formed between the outer clamping unit and the inner cover element, and a laser beam device is provided and configured to generate a laser beam and to guide it along the formed passage gap.

2. The apparatus according to claim 1, wherein
the inner cover element is configured to be plate-shaped and separate from the outer clamping unit.

3. The apparatus according to claim 1, wherein the inner cover element comprises a holding device for holding the cut workpiece.

4. The apparatus according to claim 3, wherein the holding device comprises a suction device including a vacuum plate.

5. The apparatus according to claim 3, wherein
the inner cover element is formed with the holding device for gripping and moving the cut workpiece.

6. The apparatus according to claim 1, wherein one or multiple nozzles for suctioning-off and/or blowing-off ablation particles during cutting by means of the laser beam are arranged along the passage gap on the outer clamping unit and/or the inner cover element.

7. The apparatus according to claim 6, wherein
at least one nozzle is designed as a slot nozzle with an elongated opening slot which extends along the passage gap.

8. The apparatus according to claim 6, wherein
the outer clamping unit comprises a plurality of nozzle plates with nozzles.

9. The apparatus according to claim 1, wherein
a supply device for supplying a workpiece to be cut is provided, wherein the workpiece can be supplied between the two clamping plate devices by the supply device.

10. The apparatus according to claim 1, wherein
the first clamping plate device and the second clamping plate device can be moved relatively towards one another and away from one another, respectively, for clamping the workpiece.

11. The apparatus according to claim 1, wherein
a camera device is arranged for detecting the workpiece, in particular, a position of the workpiece.

12. A method for cutting a film-like workpiece, such as an electrode sheet, by means of a laser beam with an apparatus having a clamping assembly, in accordance to claim 1, wherein the clamping assembly comprises a first clamping plate device and a second clamping plate device between which the sheet-shaped starting material is clamped, at least one clamping plate device comprises an outer clamping unit, which is adapted to an outer contour of the workpiece, and an inner cover element, which, for cutting, is arranged inside the outer clamping unit and covers an inner surface of the workpiece, wherein a passage gap for the laser beam is formed between the outer clamping unit and the inner cover element, and a laser beam device is provided, by means of which a laser beam is generated and guided along the formed passage gap.

13. The method according to claim 12, wherein for cutting, a laser beam passes above a surface of the workpiece along the passage gap for ablating workpiece material, and one or multiple passes are carried out to separate the workpiece.

\* \* \* \* \*